United States Patent
Park

(10) Patent No.: US 8,564,248 B2
(45) Date of Patent: Oct. 22, 2013

(54) COMPUTER SYSTEM MOUNTED WITH BATTERY PACK FOR PERFORMING SYSTEM CONTROL BASED ON CHARACTERISTICS OF THE BATTERY PACK AND SYSTEM MAIN BODY THEREOF

(75) Inventor: Jeong-gyu Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1262 days.

(21) Appl. No.: 12/369,246

(22) Filed: Feb. 11, 2009

(65) Prior Publication Data
US 2010/0028760 A1      Feb. 4, 2010

(30) Foreign Application Priority Data

Jul. 31, 2008 (KR) .................................. 2008-75067

(51) Int. Cl.
*H02J 7/00* (2006.01)
(52) U.S. Cl.
USPC ........................................... 320/134; 320/150
(58) Field of Classification Search
USPC .......... 324/116, 119, 124, 134, 150; 320/116, 320/119, 124, 134, 150, 127
See application file for complete search history.

(56) References Cited

U.S. PATENT DOCUMENTS

| | | | |
|---|---|---|---|
| 5,371,682 A * | 12/1994 | Levine et al. | 702/63 |
| 5,608,304 A * | 3/1997 | Okumura | 320/134 |
| 6,100,672 A | 8/2000 | Siponen | |
| 6,577,883 B1 | 6/2003 | Ueda | |
| 7,508,171 B2 * | 3/2009 | Carrier et al. | 320/138 |
| 7,615,969 B2 * | 11/2009 | Meng et al. | 320/150 |
| 8,035,348 B2 * | 10/2011 | Wang et al. | 320/150 |
| 8,058,846 B2 * | 11/2011 | Kim | 320/134 |
| 2005/0263333 A1 * | 12/2005 | Fujiki | 180/65.2 |
| 2006/0119324 A1 | 6/2006 | Kim | |
| 2006/0265610 A1 * | 11/2006 | Kim | 713/300 |
| 2008/0018304 A1 | 1/2008 | Litingtun et al. | |
| 2008/0120513 A1 | 5/2008 | Kim | |
| 2008/0204031 A1 * | 8/2008 | Iwane et al. | 324/430 |
| 2008/0238370 A1 * | 10/2008 | Carrier et al. | 320/134 |
| 2009/0286414 A1 * | 11/2009 | Ohtomo | 439/299 |
| 2010/0029442 A1 * | 2/2010 | Ito | 477/183 |

FOREIGN PATENT DOCUMENTS

| | | |
|---|---|---|
| CN | 1498439 A | 5/2004 |
| CN | 1991685 A | 7/2007 |
| CN | 101187829 A | 5/2008 |
| JP | 2001-35542 | 2/2001 |
| JP | 2001-35542 | 2/2001 |
| JP | 2001-103674 A | 4/2001 |
| KR | 10-2006-0062558 A | 6/2006 |

* cited by examiner

*Primary Examiner* — Jay Patidar
(74) *Attorney, Agent, or Firm* — Jefferson IP Law, LLP

(57) ABSTRACT

A computer system, including: a battery pack that includes at least one battery cell and a temperature sensing unit to sense the temperature of the battery cell; and a system main body that includes a system unit to perform an operation with operating power received from the battery cell, an evaluation circuit connected with the temperature sensing unit to determine the temperature of the battery cell measured by the temperature sensing unit, and a system control unit to perform system protection control if the temperature of the battery cell determined by the evaluation circuit is equal to or more than a predetermined value.

25 Claims, 5 Drawing Sheets

COMPUTER SYSTEM MOUNTED WITH BATTERY PACK FOR PERFORMING SYSTEM CONTROL BASED ON CHARACTERISTICS OF THE BATTERY PACK AND SYSTEM MAIN BODY THEREOF

CROSS-REFERENCE TO RELATED APPLICATION

This application claims the benefit of Korean Patent Application No. 2008-75067, filed Jul. 31, 2008, in the Korean Intellectual Property Office, the disclosure of which is incorporated herein by reference.

BACKGROUND OF THE INVENTION

1. Field of the Invention

Aspects of the present invention relate to a computer system mounted with a battery pack and a system main body thereof, and more particularly to a computer system capable of performing system protection control against heat generated by the battery pack, and a system main body thereof.

2. Description of the Related Art

A computer system such as a laptop computer, a mobile computer, etc. may be configured with a system main body performing a given operation, and a battery pack mounted on the system main body to supply operating power to the system main body, where the battery pack a battery cell. However, in the battery pack for the computer system, much heat may be generated during operation of the system main body. Because the temperature of the battery pack or the system main body increases due to the generated heat, a control process for protecting the computer system is necessary.

SUMMARY OF THE INVENTION

Aspects of the present invention provide a computer system and a system main body thereof that can perform system protection control with improved reliability against heat generated from a battery pack. In particular, aspects of the present invention provide a computer system including: a battery pack that includes a battery cell and a temperature sensing unit to measure the temperature of the battery cell; and a system main body that includes a system unit to perform with operating power received from the battery cell, an evaluation circuit connected with the temperature sensing unit to compare the temperature of the battery cell measured by the temperature sensing unit with a predetermined value, and a system control unit to perform system protection control if the temperature of the battery cell as compared by the evaluation circuit is equal to or more than the predetermined value. There can be more than one battery cell in the battery pack. However, the operation of these aspects of the present invention occur at a battery cell.

The system control unit may provide information about the state of the computer system based on the temperature of the battery cell that is compared to the predetermined value by the evaluation circuit. The system control unit may also reduce the operating speed of the system unit based on the temperature of the battery cell that is compared by the evaluation circuit. The system control unit may also interrupt the operating power supplied to the system unit based on the temperature of the battery cell that is compared by the evaluation circuit.

The system protection control may include at least two operations among informing a user of the state of the computer system, reducing the operating speed of the system unit, and interrupting the operating power supplied to the system unit, and the system control unit may perform the system protection control by step by step operations as the temperature of the battery cell increases. That is, the system control unit may perform at least one operation of informing a user of the state of the computer system and reducing the operating speed of the system unit if the temperature of the battery cell is equal to or more than a first predetermined value. The system control unit may also interrupt the operating power supplied to the system unit if the temperature of the battery cell is equal to or more than a second predetermined value that is larger than the first predetermined value.

The evaluation circuit may include first and second comparators that correspond to the first predetermined value and the second predetermined value, respectively. The evaluation circuit may include a hysteresis band that includes the corresponding first predetermined value and/or second predetermined value with respect to at least one of the first and second comparators. The system control unit may determine whether the battery pack is mounted or not depending on connection of the temperature sensing unit and the evaluating circuit.

Further, aspects of the present invention provide a system main body for a computer system, including: a system unit that receives operating power from a battery pack that includes a battery cell to perform the operation; an evaluation circuit that is connected with a temperature sensing unit provided to the battery pack to measure the temperature of the battery pack and compares the temperature of the battery cell measured by the temperature sensing unit with a predetermined value; and a system control unit to perform system protection control if the temperature of the battery cell compared by the evaluation circuit is equal to or more than a predetermined value. There can be more than one battery cell in the battery pack. However, the operation of these aspects of the present invention occur at a battery cell.

The system control unit may provide information about the state of the computer system based on the temperature of the battery cell that is compared to the predetermined value by the evaluation circuit. The system control unit may also reduce the operating speed of the system unit based on the temperature of the battery cell that is compared by the evaluation circuit. The system control unit may also interrupt the operating power supplied to the system unit based on the temperature of the battery cell that is compared by the evaluation circuit.

The system protection control may include at least two operations among informing a user of the state of the computer system, reducing the operating speed of the system unit, and interrupting the operating power supplied to the system unit, and the system control unit may perform the system protection control by operations as the temperature of the battery cell increases. That is, the system control unit may perform at least one operation of informing a user of the state of the computer system and reducing the operating speed of the system unit if the temperature of the battery cell is equal to or more than a first predetermined value. The system control unit may also interrupt the operating power supplied to the system unit where the temperature of the battery cell is equal to or more than a second predetermined value that is larger than the first predetermined value.

The evaluation circuit may include first and second comparators that correspond to the first predetermined value and the second predetermined value respectively. The evaluation circuit may include a hysteresis band that includes the corresponding first predetermined value and/or second predetermined value with respect to the first and second comparators. The system control unit may determine whether the battery pack is mounted or not depending on connection of the temperature sensing unit and the evaluation circuit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
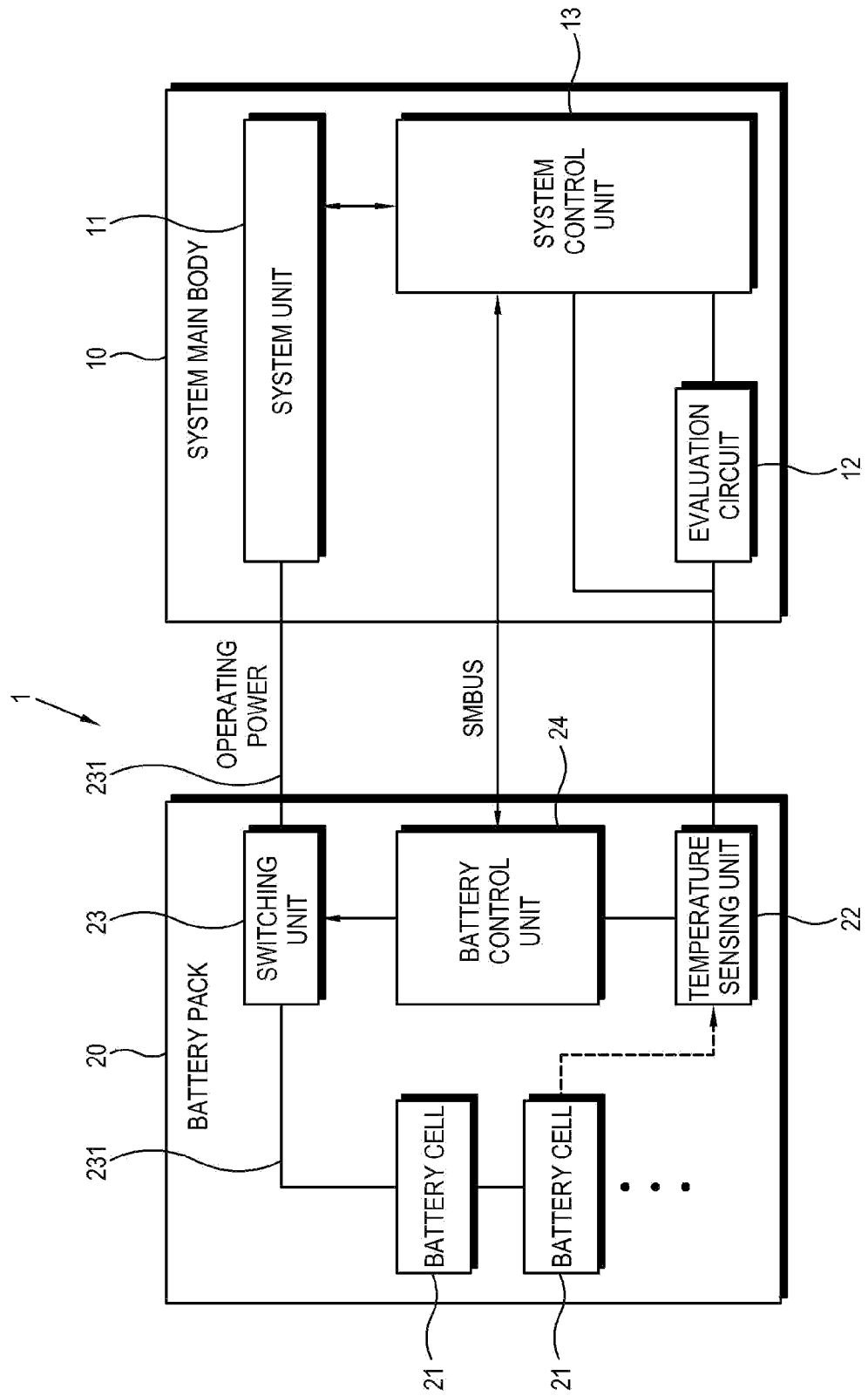
FIG. 1 illustrates the configuration of a computer system according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates the configuration of a computer system 1 according to an example embodiment of the present invention. The computer system 1 may be implemented as a laptop computer, a mobile computer, etc. As shown in FIG. 1, the computer system 1 includes a system main body 10 and a battery pack 20.

Figure 2:
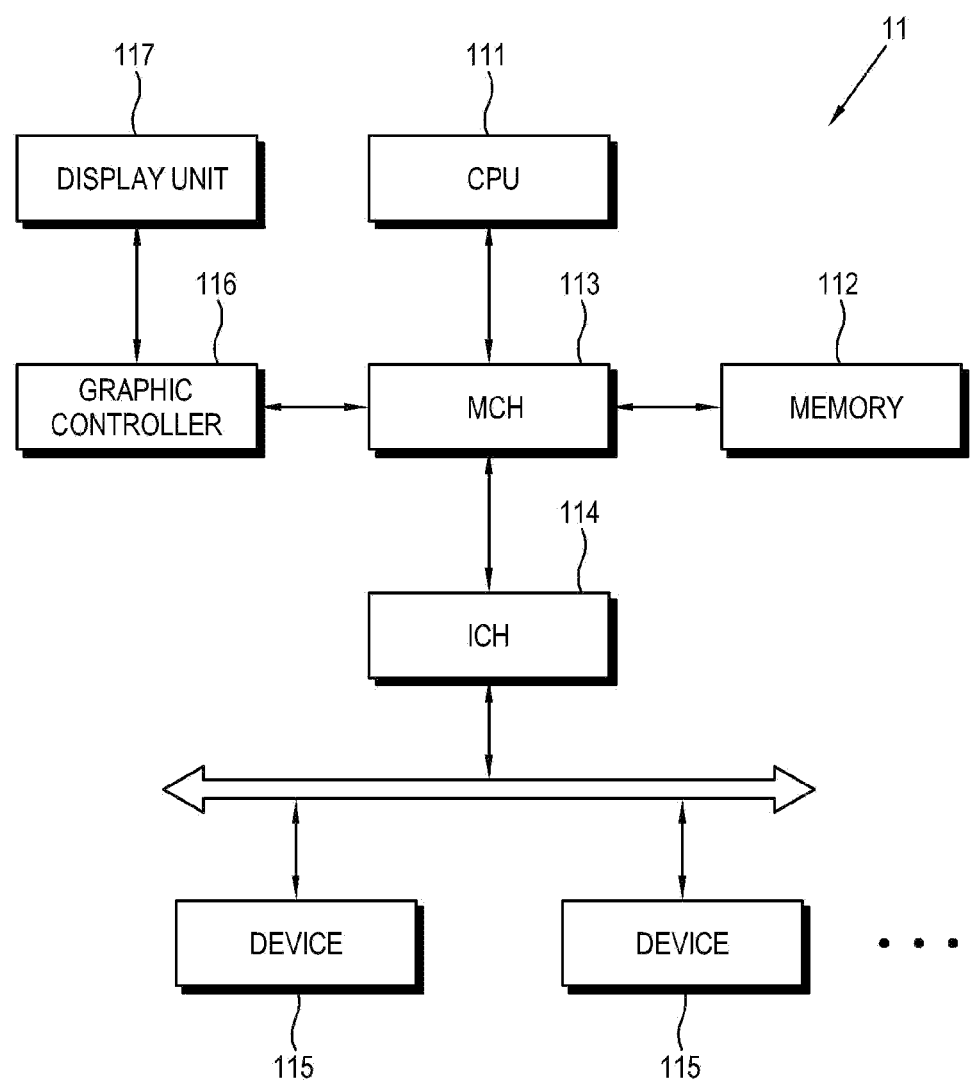
FIG. 2 illustrates the configuration of a system unit according to the example embodiment of FIG. 1.

The system main body 10 includes a system unit 11 executing a computer program to perform a given operation. FIG. 2 illustrates the configuration of the system unit 11 according to the example embodiment of FIG. 1. As shown in FIG. 2, the system unit 11 includes a central processing unit (CPU) 111, a memory 112, a memory controller hub (MCH) 113, a graphic controller 116, a display unit 117, an I/O controller hub (ICH) 114 and one or more devices 115.

The CPU 111 controls operation of the system unit 11 and executes a code loaded in the memory 112 to perform a command corresponding to the code. In performing the command, the CPU 111 may communicate with the MCH 113, the graphic controller 116, the ICH 114 and the device 115 and may control each of them.

The memory 112 stores data related to operating performance of the CPU 111, including a code executed by the CPU 111. The memory 112 may be implemented as a volatile memory, for example, a double data rate synchronous dynamic random access memory (DDR SDRAM), etc.

The graphic controller 116 processes graphic data. The MCH 113 interfaces the memory 112 with other elements such as the CPU 111, etc. to read and write data therebetween. The ICH 114 interfaces the CPU 111 with the device 115 for communication therebetween.

The device 115 may include various types of hardware, for example, a keyboard, a mouse, a tablet, a touch screen, a joystick, a web cam, an image scanner, a barcode reader, a sound card, a speaker, a microphone, a printer, a CD-ROM, a CD-R, a CD-RW, a DVD-ROM, a DVD-R, a DVD-RW, a USB drive, a modem and a network card. The display unit 117 displays video based on graphic data processed by the graphic controller 116. The display unit 117 may be implemented as a liquid crystal display (LCD), an organic light emitting diode (OLED), etc.

Referring back to FIG. 1, the battery pack 20 can be mounted on and detached from the system main body 10, and includes at least one battery cell 21 to supply operating power to the system main body 10. The system main body 10 and the battery pack 20 respectively include power supply terminals (not shown) electrically connected to each other to allow the supply of the operating power when the battery pack 20 is mounted on the system main body 10.

The battery pack 20 further includes a temperature sensing unit 22 measuring the temperature of the battery cell 21. The temperature sensing unit 22 according to the example embodiment of the present invention may be implemented as a thermistor 22 (see FIG. 3) disposed to be adjacent to the battery cell 21. The battery pack 20 may further include a switching unit 23 opening and closing a charging and discharging path 231 of the battery cell 21, and a battery control unit 24 controlling the switching unit 23 so that the battery cell 21 can be charged or discharged.

The switching unit 23 may be at least one metal oxide semiconductor field effect transistor (MOSFET) provided in the charging and discharging path 231. The battery control unit 24 may include a switch driving circuit (not shown) controlling the switching unit 23. A result from measuring the temperature of the battery cell 21 may be transmitted to the switch driving circuit. If the temperature of the battery cell 21 is more than a predetermined value, the switch driving circuit controls the switching unit 23 to break the operating power supplied to the system main body 10.

The system main body 10 may further include a system control unit 13. The battery control unit 24 may transmit information about the battery pack 20 such as the temperature of the battery cell 21, remaining battery amount, etc. to the system control unit 13. In this case, the battery control unit 24 may further include a microcomputer (not shown). The result from measuring the temperature of the battery cell 21 may be transmitted to the microcomputer. For example, communication between the microcomputer of the battery control unit 24 and the system control unit 13 may be performed by a system management bus (SMBUS) communication type. If the temperature of the battery cell 21 is more than a predetermined value, the system control unit 13 may perform system protection control based on the information about the battery pack 20 transmitted from the microcomputer of the battery control unit 24.

The system main body 10 according to this example embodiment of the present invention further includes an evaluation circuit 12 determining the temperature of the battery cell 21 in turn measured by the temperature sensing unit 22. The evaluation circuit 12 is an analog circuit, and is electrically connected to the temperature sensing unit 22 when the battery pack 20 is mounted on the system main body 10. The system main body 10 and the battery pack 20 respectively include a connection terminal (not shown) electrically connecting the evaluation circuit 12 and the temperature sensing unit 22 when the battery pack 20 is mounted on the system main body 10.

If the temperature of the battery cell 21 determined by the evaluation circuit 12 is more than a predetermined value, the system control unit 13 performs the system protecting control. According to this example embodiment of the present invention, the temperature sensing result of the temperature sensing unit 22 for the battery cell 21 is directly transmitted to the evaluation circuit 12. Accordingly, although the microcomputer of the battery control unit 24 may be incapable of appropriately operating, or the result of determining the temperature of the battery cell 21 may not be appropriately transmitted because of restrictions of communication speed, etc., the system protecting control may be promptly performed by the evaluation circuit 12 with high reliability.

Figure 3:
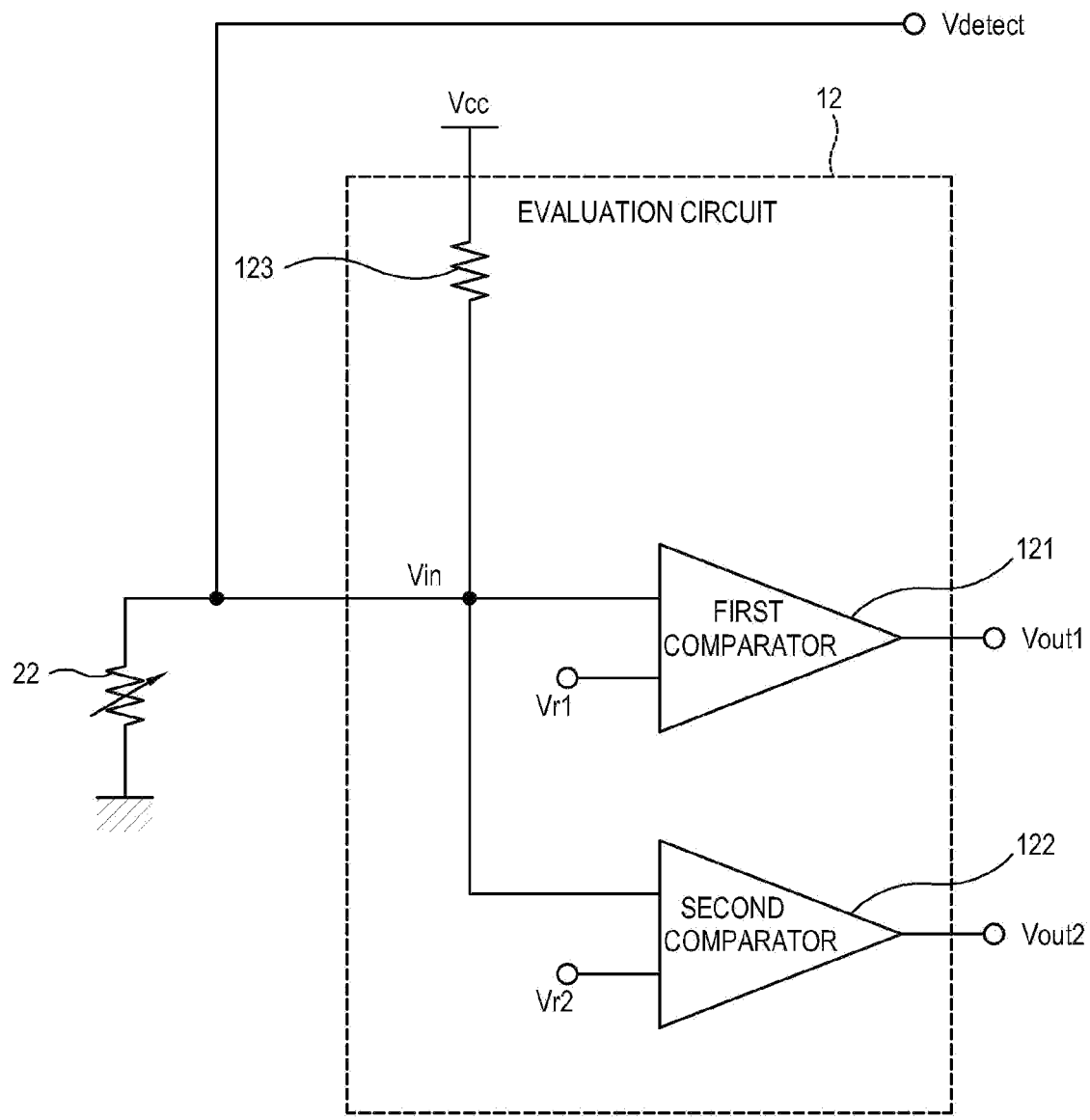
FIG. 3 illustrates the configuration of an evaluation circuit according to the example embodiment of FIG. 1.

FIG. 3 illustrates the configuration of the evaluation circuit 12 according to the example embodiment of FIG. 1. FIG. 3 illustrates an equivalent circuit diagram of the evaluation circuit 12 and the temperature sensing unit 22 when the battery pack 20 is mounted on the system main body 10.

As shown in FIG. 3, the evaluation circuit 12 may include a first comparator 121 and a second comparator 122. The evaluation circuit 12 may further include a resistor 123, and an operating voltage Vcc is applied to a first input terminal (refer to Vin) of the first comparator 121 and the second comparator 122 via the resistor 123.

The system control unit 13 according to this example embodiment of the present invention may determine mounting of the battery pack 20 depending on the connection state of the temperature sensing unit 22 and the evaluation circuit 12 are electrically connected. That is, the input voltage Vin for the first comparator 121 and for the second comparator 122 is also supplied to the system control unit 13 as a mounting sensing voltage Vdetect corresponding to the mounting of the battery pack 20.

If the battery pack 20 is detached from the system main body 10, the temperature sensing unit 22 and the evaluation circuit 12 are in an electrically open state (not shown for convenience). That leads to a level difference in the input voltage Vin of the first comparator 121 and the second comparator 122, that is, the mounting sensing voltage Vdetect that depends on the mounting of the battery pack 20 to the system main body 10.

The system control unit 13 may monitor the mounting sensing voltage Vdetect, and determine that the battery pack 20 is mounted to the system main body 10 if the mounting sensing voltage Vdetect has changed to a predetermined value. When the battery pack 20 is mounted to the system main body 10, the input voltage Vin applied to the first comparator 121 and the second comparator 122 becomes a voltage across the thermistor of the temperature sensing unit 22. If the temperature of the battery cell 21 increases, the resistance value of the thermistor increases or decreases corresponding to the temperature increase and depending on the type of the thermistor of the temperature sensing unit 22. If the resistance value of the thermistor increases or decreases, the input voltage Vin increases or decreases to correspond thereto.

The first comparator 121 and the second comparator 122 respectively correspond to a first predetermined value and a second predetermined value of the temperature of the battery cell 21. The first predetermined value and the second predetermined value are different, and for example, are set as the temperatures of the battery cell 21 in which management for protecting the computer system 1 against the heat of the battery cell 21 is needed. The first predetermined value and the second predetermined value may be determined with consideration of the operation voltage Vcc, the resistance value of the resistor 123, and the resistance values of the thermistor of the temperature sensing unit 22 under various temperatures. Second input terminals of the first comparator 121 and the second comparator 122 respectively receive a first predetermined voltage Vr1 corresponding to the first predetermined value and a second predetermined voltage Vr2 corresponding to the second predetermined value.

If the battery pack 20 is mounted on the system main body 10, the first comparator 121 and the second comparator 122 compare the input voltage Vin with the first predetermined voltage Vr1 and the second predetermined voltage Vr2 to output results thereof (refer to Vout1 and Vout2), respectively. That is, the first and second comparator 121 and 122 reverse the outputs Vout1 and Vout2 if the input voltage Vin becomes larger or smaller than the first predetermined voltage Vr1 or the second predetermined voltage Vr2, respectively.

For example, when the input voltage Vin is smaller than the first predetermined voltage Vr1, if the temperature of the battery cell 21 increases so that the input voltage Vin becomes higher than the first predetermined voltage Vr1, the output Vout1 of the first comparator 121 may be reversed from high to low, or from low to high. Alternatively, in case of another type of the thermistor of the temperature sensing unit 22, when the input voltage Vin is higher than the first predetermined voltage Vr1, if the temperature of the battery cell 21 increases so that the input voltage Vin becomes smaller than the first predetermined voltage Vr1, the output Vout1 of the first comparator 121 may be reversed from high to low, or from low to high. Also, the second comparator 122 may operate with the same principle as the first comparator 121 with respect to the input voltage Vin and the second predetermined voltage Vr2. The system control unit 13 determines whether the temperature of the battery cell 21 exceeds the predetermined first predetermined value and/or second predetermined value or not based on the outputs Vout1 and Vout2 of the first comparator 121 and the second comparator 122.

Figure 4:
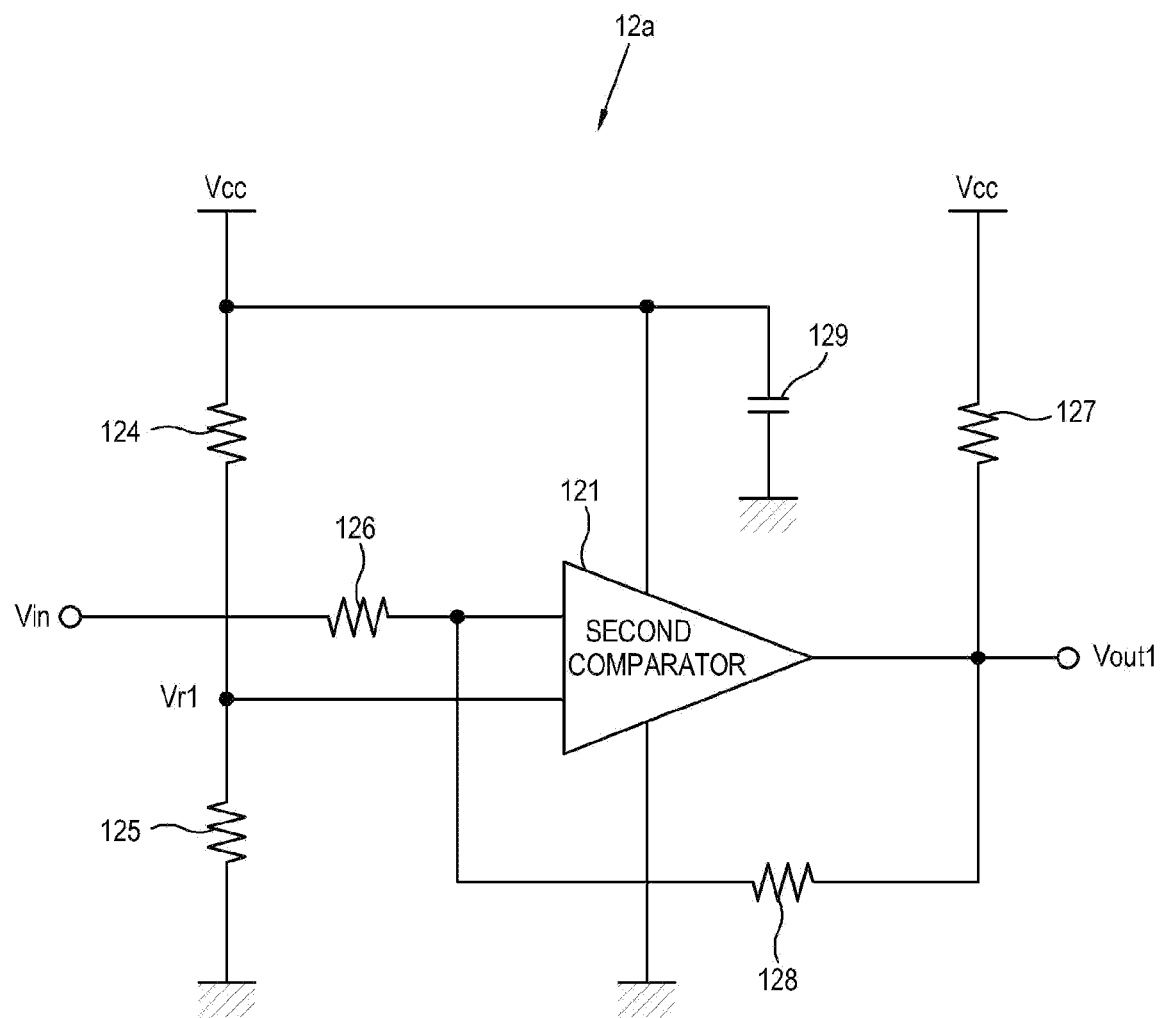
FIG. 4 illustrates the configuration of a hysteresis circuit according to the example embodiment of FIG. 1.

As an additional example embodiment, at least one of the first comparator 121 and the second comparator 122 may include a hysteresis band including a first predetermined value and/or a second predetermined value corresponding to the temperature of the battery cell 21. FIG. 4 illustrates the configuration of a hysteresis circuit 12a according to the example embodiment of FIG. 1. In FIG. 4, the first comparator 121 is illustrated as an example to include the hysteresis band. For the convenience of illustration, other configurations of the evaluation circuit 12 such as the second comparator 122, etc., are omitted.

As shown in FIG. 4, the hysteresis circuit 12a may include a first resistor to a fifth resistor 124, 125, 126, 127 and 128 and a capacitor 129. The resistance values of the first resistor to the fifth resistor 124, 125, 126, 127 and 128 are determined so that the hysteresis band including the first predetermined value can be obtained. By the hysteresis circuit 12a, since stable operation is possible by way of the hysteresis band although a noise is added to the first predetermined value, the output Vout1 of the hysteresis circuit 12a may be improved in reliability. In the present example embodiment, the first comparator 121 is illustrated to have the hysteresis band. Alternatively, the second comparator 122 may also have a hysteresis band.

Below, a system protection operation (hereafter, also referred to a 'system protection control') of the system control unit 13 according to the example embodiment of the present invention will be described by referring to FIGS. 1 to 3. The system control unit 13 according to the example embodiment of the present invention may perform the system protection control by operations based on the outputs Vout1 and Vout2 of the first comparator 121 and the second comparator 122 as the temperature of the battery cell 21 increases.

For example, in the case where the second predetermined value is set to be larger than the first predetermined value, and the system control unit 13 determines that the temperature of the battery cell 21 is equal to or more than the first predetermined value based on the output Vout1 of the first comparator 121, the system control unit 13 may inform a user of the state of the computer system 1. In this case, for example, a message like "present temperature of the computer is excessively high because of heating of the battery!!", etc. may be displayed in the display unit 117 as a type of a graphic user interface (GUI, not shown).

Also, in the case that the temperature of the battery cell 21 is equal to or more than the first predetermined value, the system control unit 13 may reduce the operating speed of the system unit 11 separately from or in addition to informing the user of the state of the computer system 1. The reduction of the operating speed of the system unit 11 may be implemented as an adjustment to the operating speed of the core of the CPU 111. The system control unit 13 may include a microcomputer for adjusting the operating speed of the core of the CPU 111, and may use a basic input/output system (BIOS), etc.

Further, if the system control unit 13 determines that the temperature of the battery cell 21 further increases to exceed the second predetermined value based on the output Vout2 of the second comparator 122, the system control unit 13 may interrupt the operating power supplied to the system unit 11. The break of the operating power supplied to the system unit 11 may be implemented as turning off the system main body 10. The system control unit 13 may include a power integrated circuit (IC) for controlling power supply for the system main body 10.

In the present example embodiment, two predetermined values are set for the temperature of the battery cell 21. The present invention is not limited thereto, and one value, or three or more values may be set for the temperature of the battery cell 21.

Hereinafter, the computer system 1 according to the example embodiment of the present invention will be described with a comparative example. As the comparative example to the example embodiment of the present invention, it is assumed that the battery control unit 24 is to interrupt the supply of the operating power in the battery pack 20 by controlling the switching unit 23 based on a result from sensing the temperature of the battery cell 21 without using the evaluation circuit 12. The battery control unit 24 may be a microcomputer that is an integrated circuit. In such case if the battery control unit 24 fails to correctly operate because of some reason, it is possible that the operating power will not be interrupted so that a hazardous situation occurs because of heating of the battery cell 21.

As another comparative example to the example embodiment of the present invention, it is assumed that the battery control unit 24 of the battery pack 20 transmits a temperature sensing result to the system control unit 13, and the system control unit 13 is intended to interrupt the operating power based on the temperature sensing result.

The communication between the battery control unit 24 and the system control unit 13 may be performed by an SMBUS. In this case, if the result from sensing the temperature of the battery cell 21 fails to be correctly transmitted because the communication state of the SMBUS is not proper, or if the temperature of the battery cell 21 rapidly increases because of a restriction in the communication speed of the SMBUS while the result from sensing the temperature of the battery cell 21 is transmitted, it is possible that protective management does not occur.

Unlike these comparative examples, the evaluation circuit 12 according to the example embodiment of the present invention is designed as an analog circuit provided to the system main body 10. Accordingly, the result from sensing the temperature of the battery cell 21 can be promptly and directly transmitted to the evaluation circuit 12 without intervention of other configurations. Because of the evaluation circuit 12 according to the example embodiment of the present invention, the system protection operation may occur promptly and with high reliability although the battery control unit 24 fails to correctly operate or the result from sensing the temperature of the battery cell 21 fails to be smoothly transmitted because of restrictions such as the communication state and communication speed of the SMBUS, etc.

Figure 5:
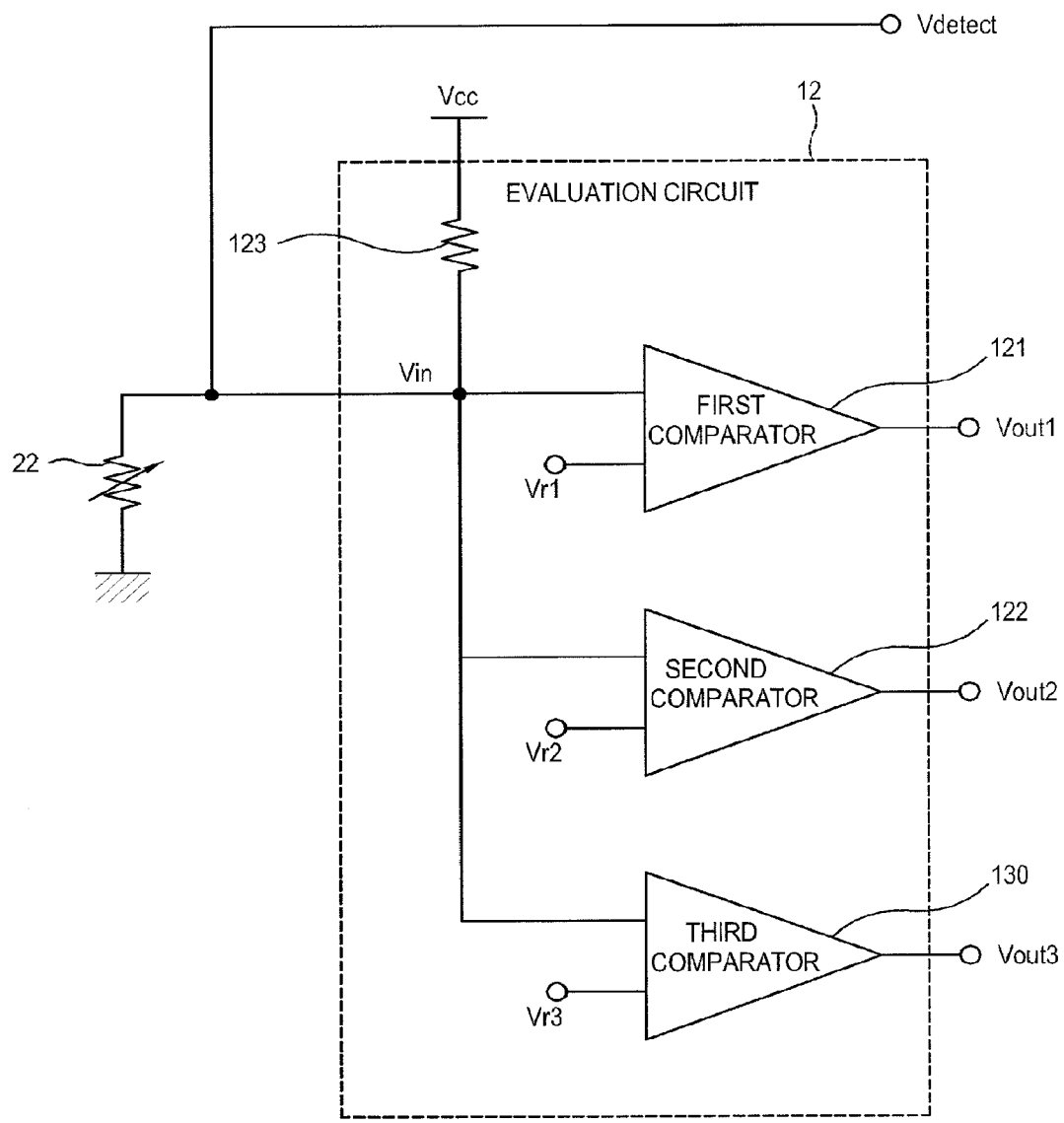
FIG. 5 illustrates the configuration of an evaluation circuit according to an exemplary embodiment.

FIG. 5 illustrates the configuration of an evaluation circuit according to an exemplary embodiment. FIG. 5 illustrates an equivalent circuit diagram of the evaluation circuit 12 and the temperature sensing unit 22 when the battery pack is mounted on the system main body 10.

Referring to FIG. 5, the evaluation circuit 12 may include three comparators 121, 122, and 130. The evaluation circuit 12 may further include a resistor 123 and an operating voltage Vcc is applied to a first input terminal (refer to Vin) of the first comparator 121, the second comparator 122, and the third comparator 130 via the resistor 123.

If the battery pack 20 is mounted on the system main body 10, the first comparator 121, the second comparators 122, and the third comparator 130 compare the input voltage Vin with the first predetermined voltage Vr1, the second predetermined voltage Vr2, and the third predetermined voltage Vr3 to output results thereof (refer to Vout 1, Vout2, and Vout3), respectively. That is, the first, second, and third comparators 121, 122, and 130 reverse the outputs Vout1, Vout 2, and Vout 2 if the input voltage Vin becomes larger or smaller than the first predetermined voltage Vr1, the second predetermined voltage Vr2, and the third predetermined voltage Vr3, respectively.

As described above, aspects of the present invention provide a computer system mounted with a battery pack and a system main body thereof rapidly performing system protection control with improved reliability.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer system, comprising:
   a battery pack that comprises a battery cell and a temperature sensing unit to measure the temperature of the battery cell; and
   a system main body that comprises a system unit to perform with operating power received from the battery cell, an evaluation circuit connected with the temperature sensing unit to compare the temperature of the battery cell measured by the temperature sensing unit with a predetermined value, and a system control unit to perform a first system protection control if the temperature of the battery cell as compared by the evaluation circuit is equal to or more than the predetermined value,
   wherein the battery pack further comprises a battery control unit to control charging and discharging of the battery cell, and
   wherein the system control unit receives information about the temperature of the battery cell from the battery control unit and performs a second system protection control based on the received information about the temperature of the battery cell.

2. The computer system according to claim 1, wherein the system control unit is configured to provide information about the state of the computer system based on the temperature of the battery cell that is compared to the predetermined value by the evaluation circuit.

3. The computer system according to claim 1, wherein the system control unit is configured to reduce the operating speed of the system unit based on the temperature of the battery cell that is compared by the evaluation circuit.

4. The computer system according to claim 1, wherein the system control unit is configured to interrupt the operating power supplied to the system unit based on the temperature of the battery cell that is compared by the evaluation circuit.

5. The computer system according to claim 1, wherein each of the first system protection control and the second system protection control comprises at least two operations among informing a user of the state of the computer system, reducing the operating speed of the system unit, and interrupting the operating power supplied to the system unit, and wherein the system control unit is configured to perform the first system protection control or the second system protection control by operations as the temperature of the battery cell increases.

6. The computer system according to claim 1, wherein the system control unit is configured to perform at least one operation of informing a user of a state of the computer system and reducing the operating speed of the system unit if the temperature of the battery cell is equal to or more than a first predetermined value.

7. The computer system according to claim 6, wherein the system control unit is configured to interrupt the operating power supplied to the system unit if the temperature of the battery cell is equal to or more than a second predetermined value that is larger than the first predetermined value.

8. The computer system according to claim 7, wherein the evaluation circuit comprises first and second comparators that correspond to the first predetermined value and the second predetermined value, respectively.

9. The computer system according to claim 8, wherein the evaluation circuit comprises a hysteresis band that comprises at least one of the corresponding first predetermined value and the second predetermined value with respect to at least one of the first and second comparators.

10. The computer system according to claim 1, wherein the system control unit is configured to determine whether the battery pack is mounted depending on electrical connection between the temperature sensing unit and the evaluating circuit.

11. The computer system according to claim 1, wherein each of the first system protection control and the second system protection control comprises operations of informing a user of the state of the computer system, reducing the operating speed of the system unit, and interrupting the operating power supplied to the system unit, the system control unit is configured to perform the first system protection control or the second system protection control by the operations as the temperature of the battery cell increases, the system control unit is configured to inform a user of the state of the computer system at the point that the temperature of the battery cell is equal to or more than a first predetermined value, the system control unit is configured to reduce the operating speed of the system unit at the point that the temperature of the battery cell is equal to or more than a second predetermined value that is larger than the first predetermined value, and the system control unit is configured to interrupt the operating power supplied to the system unit where the temperature of the battery cell is equal to or more than a third predetermined value that is larger than the second predetermined value.

12. The computer system according to claim 11, wherein the evaluation circuit comprises first, second and third comparators that correspond to the first predetermined value, the second predetermined value, and the third predetermined value, respectively.

13. The computer system according to claim 12, wherein the evaluation circuit comprises at least one hysteresis band that comprises at least one of the corresponding first predetermined value, second predetermined value or third predetermined value with respect to the corresponding first, second and third comparators.

14. The computer system according to claim 1, wherein the battery cell comprises a plurality of battery cells and the temperature sensing unit measures the temperature at one of the battery cells.

15. A system main body for a computer system, comprising:

a system unit that receives operating power from a battery pack that comprises a battery cell to perform an operation;

an evaluation circuit that is electrically connected to a temperature sensing unit provided to the battery pack to measure the temperature of the battery pack, and compares the temperature of the battery cell measured by the temperature sensing unit with a predetermined value; and a system control unit to perform a first system protection control if the temperature of the battery cell compared by the evaluation circuit is equal to or more than the predetermined value, wherein the system control unit receives information about the temperature of the battery cell from a battery control unit, which is provided in the battery pack and controls charging and discharging of the battery cell, and performs a second system protection control based on the received information about the temperature of the battery cell.

16. The system main body for the computer system according to claim 15, wherein the system control unit is configured to provide information about the state of the computer system based on the temperature of the battery cell that is compared by the evaluation circuit.

17. The system main body for the computer system according to claim 15, wherein the system control unit is configured to reduce the operating speed of the system unit based on the temperature of the battery cell that is compared by the evaluation circuit.

18. The system main body for the computer system according to claim 15, wherein the system control unit is configured to interrupt the operating power supplied to the system unit based on the temperature of the battery cell that is compared by the evaluation circuit.

19. The system main body for the computer system according to claim 15, wherein each of the first system protecting control and the second system protecting control comprises at least two operations among informing a user of the state of the computer system, reducing the operating speed of the system unit, and interrupting the operating power supplied to the system unit, and wherein the system control unit is configured to perform the first system protection control or the second system protecting control by operations as the temperature of the battery cell increases.

20. The system main body for the computer system according to claim 15, wherein the system control unit is configured to perform at least one operation of informing a user of a state of the computer system and reducing the operating speed of the system unit if the temperature of the battery cell is equal to or more than a first predetermined value.

21. The system main body for the computer system according to claim 20, wherein the system control unit is configured to interrupt the operating power supplied to the system unit if the temperature of the battery cell is equal to or more than a second predetermined value that is larger than the first predetermined value.

22. The system main body for the computer system according to claim 21, wherein the evaluation circuit comprises first and second comparators that correspond to the first predetermined value and the second predetermined value respectively.

23. The system main body for the computer system according to claim 22, wherein the evaluation circuit comprises a hysteresis band that comprises the corresponding first predetermined value and/or second predetermined value with respect to at least one of the first and second comparators.

24. The system main body for the computer system according to claim 15, wherein the system control unit is configured to determine whether the battery pack is mounted depending on electrical connection of the temperature sensing unit with the evaluation circuit.

25. A method of protecting a computer system comprising a battery pack with a battery cell, a temperature sensing unit, a system unit, a system control unit, an evaluation circuit, and at least one comparator, the method comprising:

measuring the temperature in the battery cell with the temperature sensing unit;

in operations, comparing the temperature measured in the temperature sensing unit to one or more predetermined values with the evaluation circuit;

determining when the temperature in the battery cell exceeds each of the predetermined values;

outputting the one or more determinations to the corresponding comparator; and performing the system protection indicated by the respective comparator, wherein at the point that a first predetermined value is met or exceeded, a first comparator causes the system control unit to display information about the computer system based on the temperature of the battery cell, wherein at the point that a second predetermined value is met or exceeded, a second comparator causes the system control unit to reduce the operating speed of the system unit based on the temperature of the battery cell, and wherein at the point that a third predetermined value is met or exceeded, a third comparator causes the system control unit to interrupt the operating power supplied to the system based on the temperature of the battery cell.

* * * * *